United States Patent
Shahoian et al.

(10) Patent No.: US 12,285,988 B2
(45) Date of Patent: Apr. 29, 2025

(54) VEHICLE WITH INDEPENDENTLY ADJUSTABLE SUSPENSION

(71) Applicant: Glydways Inc., South San Francisco, CA (US)

(72) Inventors: Erik Shahoian, Sonoma, CA (US); Patrick Kessler, San Francisco, CA (US)

(73) Assignee: Glydways Inc., South San Francisco, CA (US)

( * ) Notice: Subject to any disclaimer, the term of this patent is extended or adjusted under 35 U.S.C. 154(b) by 0 days.

(21) Appl. No.: 18/421,869

(22) Filed: Jan. 24, 2024

(65) Prior Publication Data
US 2024/0157751 A1    May 16, 2024

Related U.S. Application Data

(63) Continuation of application No. 16/591,164, filed on Oct. 2, 2019, now Pat. No. 11,904,649.

(60) Provisional application No. 62/742,119, filed on Oct. 5, 2018.

(51) Int. Cl.
| | |
|---|---|
| *B61D 3/04* | (2006.01) |
| *B60G 3/20* | (2006.01) |
| *B60G 15/06* | (2006.01) |
| *B60G 17/02* | (2006.01) |

(52) U.S. Cl.
CPC ........... *B60G 17/025* (2013.01); *B60G 3/207* (2013.01); *B60G 15/067* (2013.01); *B60G 2204/4193* (2013.01)

(58) Field of Classification Search
CPC .... B60G 17/025; B60G 3/207; B60G 15/067; B60G 2204/4193
See application file for complete search history.

(56) References Cited

U.S. PATENT DOCUMENTS

| | | | | |
|---|---|---|---|---|
| 3,765,692 | A  * | 10/1973 | Barber | B60G 17/019 280/6.151 |
| 5,839,741 | A | 11/1998 | Heyring | |
| 6,419,050 | B1 * | 7/2002 | Sardonico | A61G 3/067 187/244 |
| 6,467,784 | B1 | 10/2002 | Kim | |
| 6,499,754 | B1 | 12/2002 | Heyring | |
| 7,377,522 | B2 | 5/2008 | Macisaac | |
| 7,418,325 | B2 | 8/2008 | Yamada | |
| 7,744,098 | B2 | 6/2010 | Sano | |
| 7,914,042 | B2 * | 3/2011 | Andersen | B65G 69/003 414/401 |
| 10,054,203 | B2 | 8/2018 | Fida | |
| 11,097,590 | B2 | 8/2021 | Simula | |
| 11,124,037 | B2 | 9/2021 | Newhan | |

(Continued)

*Primary Examiner* — Toan C To
(74) *Attorney, Agent, or Firm* — Brownstein Hyatt Farber Schreck, LLP

(57) ABSTRACT

A vehicle may include a frame structure, four wheels, and four independent suspension systems coupled to the frame structure and configured to support the wheels relative to the frame structure. Each suspension system may include a suspension arm movably coupling a respective wheel to the frame structure, a torsion bar coupled to the suspension arm and imparting a spring force on the suspension arm, a preload arm coupled to the torsion bar, and a preload adjustment motor coupled to the preload arm and configured to rotate the torsion bar to adjust a preload on the torsion bar.

20 Claims, 10 Drawing Sheets

(56) References Cited

U.S. PATENT DOCUMENTS

| | | |
|---|---|---|
| 11,541,913 B2 * | 1/2023 | Dausoa ................. B61F 5/02 |
| 11,565,752 B2 | 1/2023 | Rogers |
| 11,904,649 B1 * | 2/2024 | Shahoian ............ B60G 17/025 |
| 2010/0013175 A1 | 1/2010 | Maeda |
| 2013/0190955 A1 | 7/2013 | Halwes |
| 2013/0241168 A1 | 9/2013 | Michel |
| 2014/0232083 A1 | 8/2014 | Mohrlock |
| 2017/0174231 A1 * | 6/2017 | Bochud ................. B61F 5/22 |
| 2018/0001914 A1 * | 1/2018 | Dausoa ................. B61F 5/00 |
| 2019/0193620 A1 * | 6/2019 | Matsuoka ........... B60K 7/0007 |
| 2022/0402736 A1 | 12/2022 | Zahdeh |

* cited by examiner

VEHICLE WITH INDEPENDENTLY ADJUSTABLE SUSPENSION

CROSS-REFERENCE TO RELATED APPLICATION(S)

This application is a continuation patent application of U.S. patent application Ser. No. 16/591,164, filed Oct. 2, 2019, and titled "VEHICLE WITH INDEPENDENTLY ADJUSTABLE SUSPENSION," which claims the benefit of U.S. Provisional Patent Application No. 62/742,119, filed Oct. 5, 2018 and titled "VEHICLE WITH INDEPENDENTLY ADJUSTABLE SUSPENSION," the disclosures of which are hereby incorporated herein by reference in their entirety.

FIELD

The described embodiments relate generally to vehicles, and, more particularly, to vehicles with independently adjustable suspension.

BACKGROUND

Vehicles, such as cars, trucks, vans, busses, trams, and the like, are ubiquitous in modern society. Cars, trucks, and vans are frequently used for personal transportation to transport relatively small numbers of passengers, while busses, trams, and other large vehicles are frequently used for public transportation. Such road-going vehicles are often optimized for a particular use. For example, high-performance cars may be optimized for speed and handling, while vans may be optimized for comfort and passenger capacity.

SUMMARY

A vehicle may include a frame structure, four wheels, and four independent suspension systems coupled to the frame structure and configured to support the wheels relative to the frame structure. Each suspension system may include a suspension arm movably coupling a respective wheel to the frame structure, a torsion bar coupled to the suspension arm and imparting a spring force on the suspension arm, a preload arm coupled to the torsion bar, and a preload adjustment motor coupled to the preload arm and configured to rotate the torsion bar to adjust a preload on the torsion bar. The preload arm may define a set of gear teeth, each independent suspension system may further include a worm gear coupled to the preload adjustment motor and engaged with the set of gear teeth, and the preload adjustment motor may be configured to adjust the preload on the torsion bar by rotating the worm gear against the gear teeth, thereby rotating the preload arm. The suspension arm may be an A-arm.

The vehicle may be configured to lower the frame structure onto a rigid support structure by reducing the preload on the torsion bars of each of the four independent suspension systems. The vehicle may be configured to increase the preload on the torsion bars of each of the four independent suspension systems in response to detecting additional payload weight on the vehicle. Increasing of the preload on the torsion bars of each of the four independent suspension systems may substantially maintain a ride height of the vehicle despite the additional payload weight.

The vehicle may be configured to increase the preload on the torsion bars of at least two of the four independent suspension systems in response to detecting a roll motion of the vehicle. The vehicle may be configured to increase the preload on the torsion bars of at least two of the four independent suspension systems in response to detecting a pitch motion of the vehicle.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
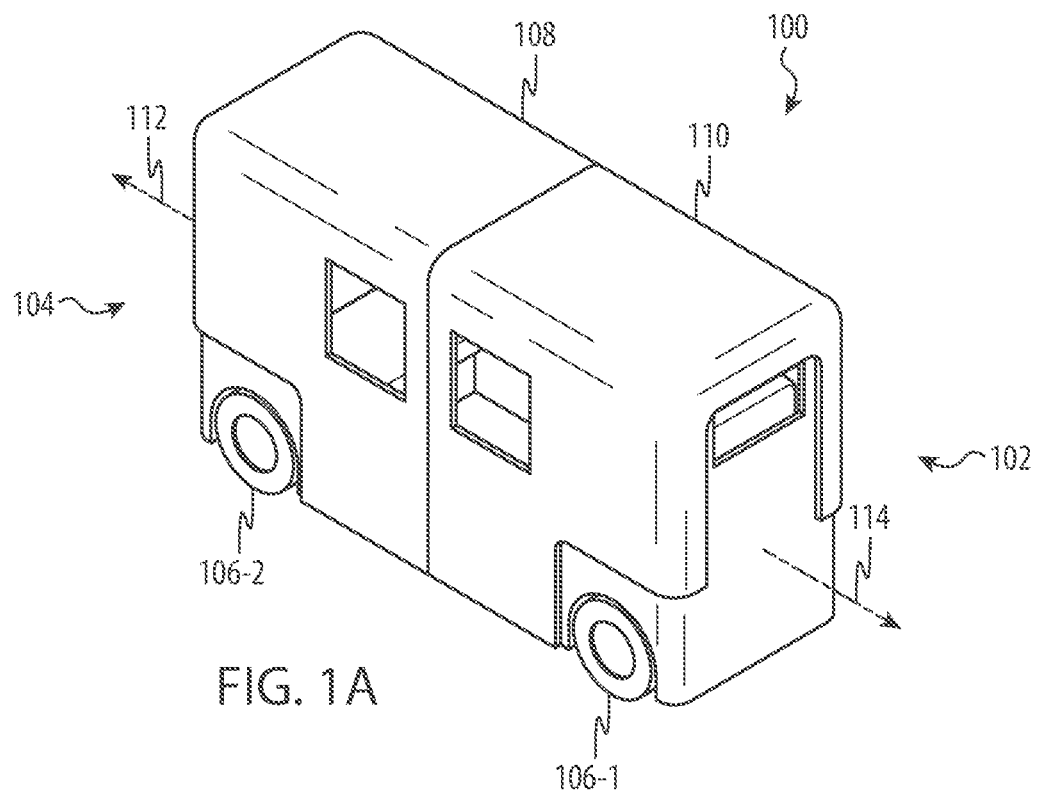
FIGS. 1A-1B depict an example vehicle.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to vehicles that may be used in a transportation system in which numerous vehicles may be autonomously operated to transport passengers and/or freight. For example, a transportation system or service may provide a fleet of vehicles that operate along a roadway to pick up and drop off passengers at either pre-set locations or stops, or at dynamically selected locations (e.g., selected by a person via a smartphone). While the vehicles may be adapted for independent operation, the vehicle fleet or portions of the vehicle fleet may be controlled by a central processing unit or computerized system.

Vehicles in such a transportation system may be configured to operate autonomously. As used herein, the term "autonomous" may refer to a mode or scheme in which vehicles can operate without continuous, manual control by a human operator. For example, vehicles may navigate along a roadway (and without an on-board driver) using a system of sensors that guide the vehicle, and a system of automatic drive and steering mechanisms that control the speed and direction of the vehicle. In some cases, the vehicles may not require steering, speed, or directional control from the passengers, and may exclude controls such as passenger-accessible accelerator and brake pedals, steering wheels, and other manual controls. In some cases, the vehicles may include manual drive controls that may be used for maintenance, emergency overrides, or the like. Such controls may be hidden, stowed, or otherwise not directly accessible by a user during normal vehicle operation. For example, they may be designed to be accessed only by trained operators, maintenance personnel, or the like.

Autonomous operation need not exclude all human or manual operation of the vehicles or of the transportation system as a whole. For example, human operators may be able to intervene in the operation of a vehicle for safety, convenience, testing, or other purposes. Such intervention may be local to the vehicle, such as when a human driver takes controls of the vehicle, or remotely, such as when an operator sends commands to the vehicle via a remote control system. Similarly, some aspects of the vehicles may be controlled by passengers of the vehicles. For example, a passenger in a vehicle may select a target destination, a route, a speed, control the operation of the doors and/or windows, or the like. Accordingly, it will be understood that the terms "autonomous" and "autonomous operation" do not necessarily exclude all human intervention or operation of the individual vehicles or of the overall transportation system.

The vehicles in an autonomous transportation system as described herein may be operated on a fully public roadway, or on a closed system of lanes. A closed system of lanes may, for example, include a lane or set of lanes that is adjacent a public roadway and in some cases shares a common tarmac road surface. In cases where a closed system of lanes is used, the lanes may be customized for the operation of the vehicles and the transportation system as a whole. The lanes may have markers, signs, fiducials, or other objects or components on, in, or proximate the lanes to help the vehicles operate. For example, vehicles may include sensors that can sense magnetic markers that are embedded in the road surface to help guide the vehicles and allow the vehicles to determine their location, speed, orientation, or the like. As another example, the roadway may have signs or other indicators that can be detected by cameras on the vehicle and that provide information such as location, speed limit, traffic flow patterns, and the like.

The vehicles in the transportation may include various sensors, cameras, communications systems, processors, and/ or other components or systems that help facilitate autonomous operation. For example, the vehicles may include a sensor array that detects magnets or other markers embedded in the road surface and which help the vehicle determine its location, position, and/or orientation on the roadway. The vehicles may also include wireless vehicle-to-vehicle communications systems, such as optical communications systems, that allow the vehicles to inform one another of operational parameters such as their braking status, acceleration status, their next maneuver (e.g., right turn, left turn, planned stop), their number or type of payload (e.g., humans or freight), or the like. The vehicles may also include wireless communications systems to facilitate communication with a central operations system that has supervisory command and control authority over the transportation system.

The vehicles in the transportation system may be designed to enhance the operation and convenience of the transportation system. For example, a primary purpose of the transportation system may be to provide comfortable, convenient, rapid, and efficient personal transportation. To provide personal comfort, the vehicles may be designed for easy passenger ingress and egress, and may have comfortable seating arrangements with generous legroom and headroom. The vehicles may also have a sophisticated suspension system that provides a comfortable ride and a dynamically adjustable parameters to help keep the vehicle level, positioned at a convenient height, and to ensure a comfortable ride throughout a range of variable load weights.

Conventional personal automobiles are designed for operation primarily in only one direction. This is due in part to the fact that drivers are oriented forwards, and operating in reverse for long distances is generally not safe or necessary. However, in autonomous vehicles, where humans are not directly controlling the operation of the vehicle in real-time, it may be advantageous for a vehicle to be able to operate bidirectionally. For example, the vehicles in a transportation system as described herein may be substantially symmetrical, such that the vehicles lack a visually or mechanically distinct front or back. Further, the wheels may be controlled sufficiently independently so that the vehicle may operate substantially identically no matter which end of the vehicle is facing the direction of travel. This symmetrical design provides several advantages. For example, the vehicle may be able to maneuver in smaller spaces by potentially eliminating the need to make U-turns or other maneuvers to re-orient the vehicles so that they are facing "forward" before initiating a journey.

Figure 1B:
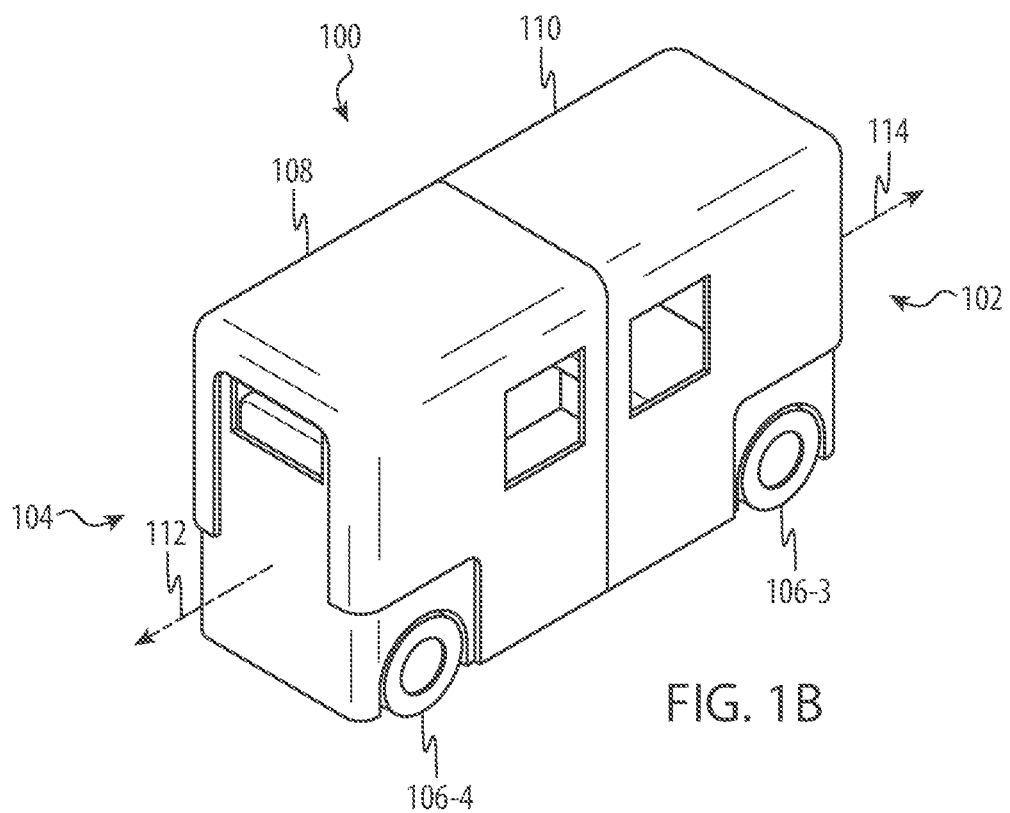

FIGS. 1A and 1B are perspective views of an example vehicle 100 that may be used in a transportation system as described herein. FIGS. 1A-1B illustrate the symmetry and bidirectionality of the vehicle 100. In particular, the vehicle 100 defines a first end 102, shown in the forefront in FIG. 1A, and a second end 104, shown in the forefront in FIG. 1B. In some examples and as shown, the first and second ends 102, 104 are substantially identical. Moreover, the vehicle 100 may be configured so that it can be driven with either end facing the direction of travel. For example, when the vehicle 100 is travelling in the direction indicated by arrow 114, the first end 102 is the leading end of the vehicle 100, while when the vehicle 100 is traveling in the direction indicated by arrow 112, the second end 104 is the leading end of the vehicle 100.

The vehicle 100 may also include wheels 106 (e.g., 106-1-106-4). The wheels 106 may be paired according to their proximity to an end of the vehicle. Thus, wheels 106-1, 106-3 may be positioned proximate the first end 102 of the vehicle and may be referred to as a first pair of wheels 106, and the wheels 106-2, 106-4 may be positioned proximate the second end 104 of the vehicle and may be referred to as a second pair of wheels 106. Each pair of wheels may be driven by at least one motor (e.g., an electric motor), and each pair of wheels may be able to steer the vehicle. Because each pair of wheels is capable of turning to steer the vehicle, the vehicle may have similar driving and handling characteristics regardless of the direction of travel. In some cases, the vehicle may be operated in a two-wheel steering mode, in which only one pair of wheels steers the vehicle 100 at a given time. In such cases, the particular pair of wheels that steers the vehicle 100 may change when the direction of travel changes. In other cases, the vehicle may be operated in a four-wheel steering mode, in which the wheels are operated in concert to steer the vehicle. In a four-wheel steering mode, the pairs of wheels may either turn in the same direction or in opposite directions, depending on the steering maneuver being performed and/or the speed of the vehicle.

The vehicle 100 may also include doors 108, 110 that open to allow passengers and other payloads (e.g., packages, luggage, freight) to be placed inside the vehicle 100. The doors 108, 110, which are described in greater detail herein, may extend over the top of the vehicle such that they each define two opposite side segments. For example, each door defines a side segment on a first side of the vehicle and another side segment on a second, opposite side of the vehicle. The doors also each define a roof segment that extends between the side segments and defines part of the roof (or top side) of the vehicle. In some cases, the doors 108, 110 resemble an upside-down "U" in cross-section and may be referred to as canopy doors. The side segments and the roof segment of the doors may be formed as a rigid structural unit, such that all of the components of the door (e.g., the side segments and the roof segment) move in concert with one another. In some cases, the doors 108, 110 include a unitary shell or door chassis that is formed from a monolithic structure. The unitary shell or door chassis may be formed from a composite sheet or structure including, for example, fiber glass, carbon composite, and/or other lightweight composite materials.

Figure 2A:
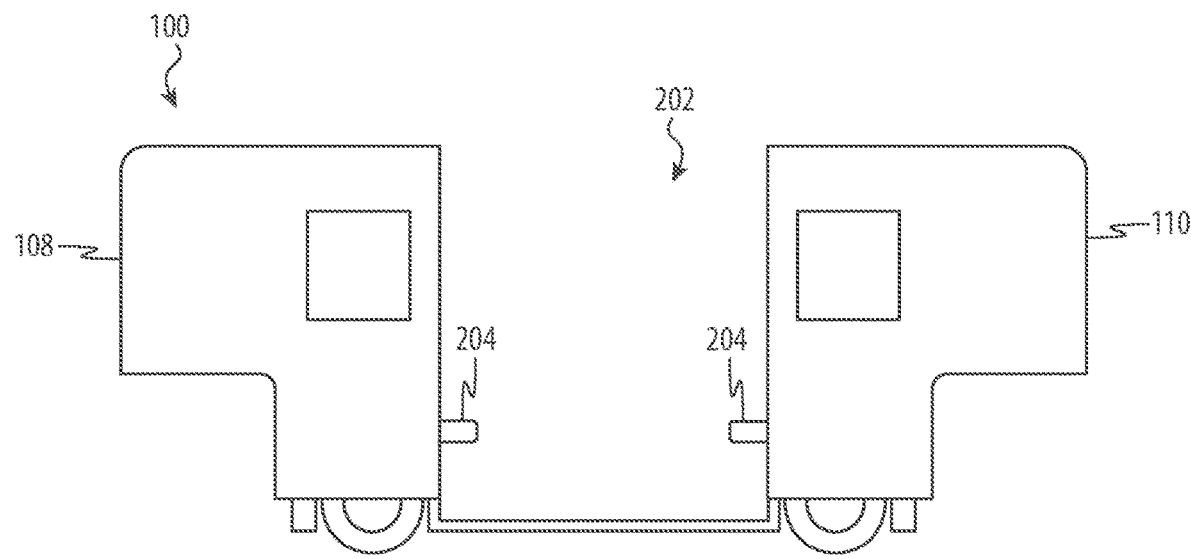
FIGS. 2A-2B depict the vehicle of FIGS. 1A-1B with its doors open.
Figure 2B:
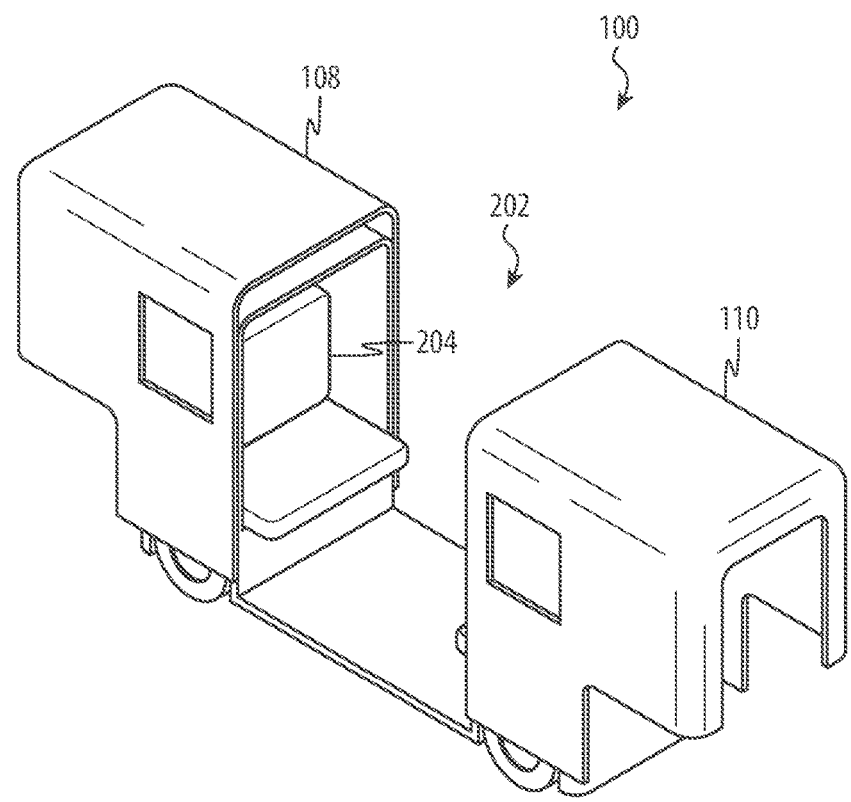

FIGS. 2A and 2B are side and perspective views of the vehicle 100 with the doors 108, 110 in an open state. Because the doors 108, 110 each define two opposite side segments and a roof segment, an uninterrupted internal space 202 may be revealed when the doors 108, 110 are opened. In the example depicted in FIGS. 2A and 2B, when the doors 108, 110 are opened, an open section may be defined between the doors 108, 110 that extends from one side of the vehicle 100 to the other. This may allow for unimpeded ingress and egress into the vehicle 100 by passengers on either side of the vehicle 100. The lack of an overhead structure when the doors 108, 110 are opened may allow passengers to walk across the vehicle 100 without a limit on the overhead clearance.

The vehicle 100 may also include seats 204, which may be positioned at opposite ends of the vehicle 100 and may be facing one another. As shown the vehicle includes two seats 204, though other numbers of seats and other arrangements of seats are also possible (e.g., zero seats, one seat, three seats, etc.). In some cases, the seats 204 may be removed, collapsed, or stowed so that wheelchairs, strollers, bicycles, or luggage may be more easily placed in the vehicle 100.

Figure 3A:
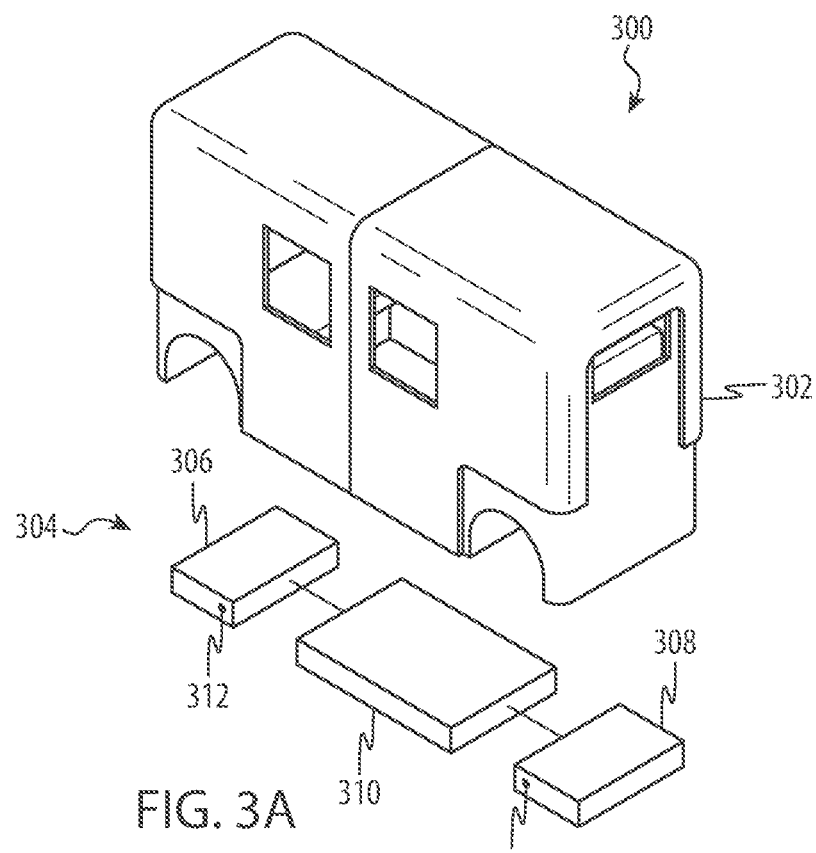
FIG. 3A depicts a partial exploded view of an example configuration of a vehicle.
Figure 3B:
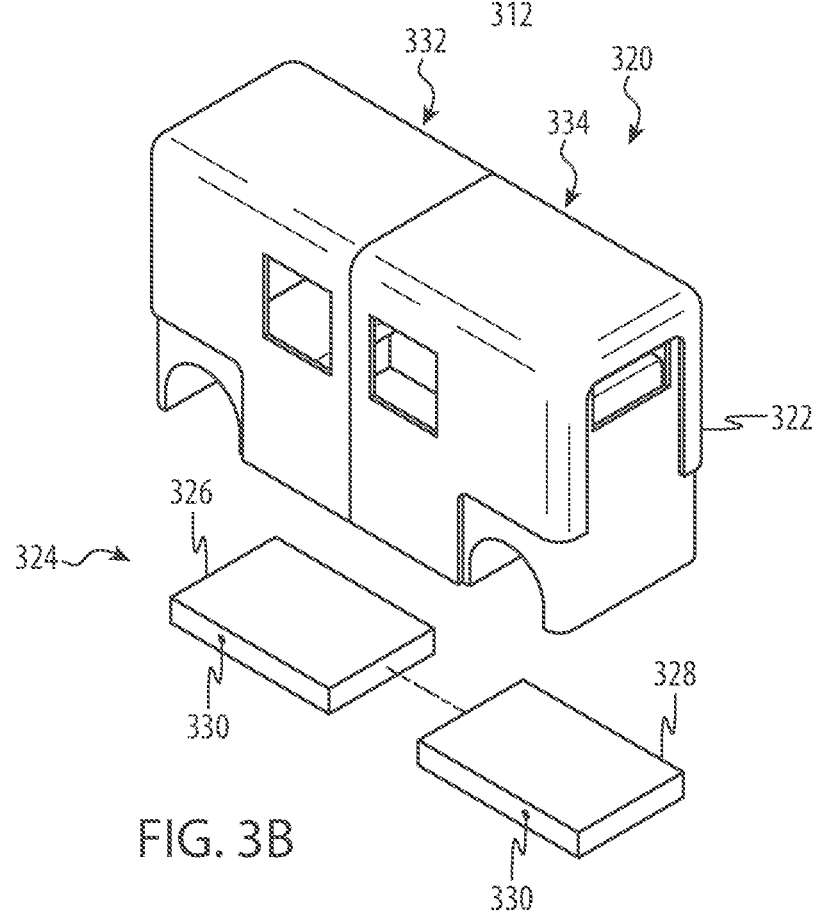
FIG. 3B depicts a partial exploded view of another example configuration of a vehicle.

Vehicles for use in a transportation system as described herein, such as the vehicle 100, may be designed for safe and comfortable operation, as well as for ease of manufacture and maintenance. To achieve these advantages, the vehicles may be designed to have a frame structure that includes many of the structural and operational components of the vehicle (e.g., the motor, suspension, batteries, etc.) and that is positioned low to the ground. A body structure may be attached or secured to the frame structure. FIGS. 3A-3B illustrate partial exploded views of vehicles, which may be embodiments of the vehicle 100, showing example configurations of a frame structure and body structure. As described below, the low position of the frame structure combined with the relatively light-weight body structure produces a vehicle with a very low center of gravity, which increases the safety and handling of the vehicle. For example, a low center of gravity reduces the rollover risk of the vehicle when the vehicle encounters slanted road surfaces, wind loading, sharp turns, or the like, and also reduces body roll of the vehicle during turning or other maneuvers. Further, by positioning many of the operational components of the vehicle, such as motors, batteries, control systems, sensors (e.g., sensors that detect road-mounted magnets or other markers), and the like, on the frame structure, manufacture and repair may be simplified.

FIG. 3A is a partial exploded view of a vehicle 300, which may be an embodiment of the vehicle 100. Details of the vehicle 100 may be equally applicable to the vehicle 300, and will not be repeated here. The vehicle 300 may include a body structure 302, which may include doors (e.g., the doors 108, 110, described above) and other body components, and a frame structure 304 to which the body structure 302 is attached.

The frame structure 304 may be formed by coupling together several structural components. For example, FIG. 3A shows a frame structure 304 that includes a base module 310 and first and second wheel modules 306, 308. The wheel modules 306, 308 may be the same or similar to one another, and may in fact be interchangeable with one another. In this way, assembly and repair may be simplified as wheel modules may be replaced and/or swapped easily and quickly, and fewer unique replacement parts may be necessary to produce and/or store.

The wheel modules 306, 308 may include drive, suspension, and steering components of the vehicle. For example, the wheel modules may include wheel suspension systems (which may define or include wheel mounts, axles, or hubs, represented in FIG. 3A as points 312), steering systems, drive motors, and optionally motor controllers. Wheels may be mounted to the wheel suspension systems via the wheel mounts, axles, hubs or the like. The drive motors may include one or more drive motors that drive the wheels, either independently or in concert with one another. The drive motors may receive power from a power source (e.g., battery) that is mounted on the base module 310. Motor controllers for the drive motors may also be mounted on the wheel modules 306, 308, or they may be mounted on the base module 310.

The suspension systems may be any suitable type of suspension system. In some cases, the suspension systems include independent suspension systems for each wheel. For example, the suspension systems may be double-wishbone torsion-bar suspension systems. The suspension systems may also be dynamically adjustable, such as to control the ride height, suspension preload, damping, or other suspension parameters while the vehicle is stationary or while it is moving. Other suspension systems are also contemplated, such as swing axle suspension, sliding pillar suspension, MacPherson strut suspension, or the like. Moreover, spring and damping functions may be provided by any suitable component or system, such as coil springs, leaf springs, pneumatic springs, hydropneumatic springs, magneto-rheological shock absorbers, and the like.

The wheel modules 306, 308 may also include steering systems that allow the wheels to be turned to steer the vehicle. In some cases the wheels may be independently steerable, or they may be linked (e.g., via a steering rack) so that they always point in substantially the same direction during normal operation of the vehicle. As noted above, because each pair of wheels is steerable, either wheel module 306, 308 may be the leading or trailing wheel module at a given time.

The base module 310 may include components such as batteries, motors and mechanisms for opening and closing the vehicle's doors, control systems (including computers or other processing units), and the like. The wheel modules 306, 308 may be attached to the base module 310 in a secure manner, such as via bolts or other fasteners, interlocking structures, rivets, welds, or the like. In some cases, the wheel modules 306, 308 are removable from the base module 310 in a non-destructive manner (e.g., without having to cut weldments or metal or otherwise damage the structural material of the module) so that the modules may be replaced or disassembled from one another for ease of service or repair. For example, the wheel modules 306, 308 may be removably attached to the base module 310 using one or more threaded fasteners or pins.

FIG. 3B is a partial exploded view of a vehicle 320, which may be an embodiment of the vehicle 100. Details of the vehicle 100 may be equally applicable to the vehicle 320, and will not be repeated here. The vehicle 320 may include a body structure 322, which may include doors (e.g., the doors 108, 110, described above) and other body components, and a frame structure 324 to which the body structure 322 is attached.

Whereas the frame structure 304 in FIG. 3A included a base module and two wheel modules, the frame structure 324 in FIG. 3B includes two wheel modules 326, 328 and no separate base module. The wheel modules 326, 328 may include all of the components of the wheel modules 306, 308 in FIG. 3B, but may also include components that were coupled to or otherwise integrated with the base module 310. For example, each wheel module 326, 328 may include wheel suspension (which may include wheel mounts or axles, illustrated in FIG. 3B as points 330), steering systems, drive motors, and motor controllers.

The wheel modules 326, 328 may also include batteries, control systems (including computers or other processing units), motors and mechanisms for opening and closing the vehicle's doors, and the like. In some cases, components of the wheel modules 326, 328 may be configured to be backup or redundant components. For example, each wheel module 326, 328 may include a control system that is capable of controlling all of the operations of the vehicle, including controlling the components and mechanisms of its own wheel module as well as those of the other wheel module of the frame structure 324. Accordingly, if one control system malfunctions or fails, the other control system on the other wheel module may seamlessly assume operation of the vehicle.

The wheel modules 326, 328 may be attached to one another in a secure manner, such as via bolts or other fasteners, interlocking structures, rivets, welds, or the like. In some cases, the wheel modules 326, 328 are removable from one another in a non-destructive manner (e.g., without having to cut weldments or metal or otherwise damage the structural material of the module) so that the modules may be replaced or disassembled from one another for ease of service or repair. For example, the wheel modules 326, 328 may be removably attached to the base module 310 using one or more threaded fasteners or pins.

While the body structure 322 is shown in FIG. 3B as separate from the frame structure 324, other embodiments may integrate the body structure 322 with the frame structure 324. For example, the body structure 322 may have a first segment 332 and a second segment 334, which may be structurally coupled to the wheel modules 326, 328, respectively. In this way, structural components of the body structure 322 and the frame structure 324 that require or benefit from precise alignment may be assembled to a common substructure, thereby reducing misalignment between those components. For example, as described herein, door mechanisms may include a four-bar linkage with one pivot positioned on the first body segment 332, and another pivot positioned on or near the wheel module 326 (e.g., the wheel module directly below that body segment). By building the first body segment 332 to the underlying wheel module 326, the relative position between these pivots may be more tightly controlled allowing for more predictable or reliable operation of the door mechanism. Additionally, in many cases the alignment between the first and second segments 332, 334 of the body structure 322 may be less important than the alignment between a given segment of the body structure 322 and the underlying wheel module. Accordingly, integrating separate segments of the body structure 322 with separate wheel modules may improve the tolerances and alignment of the components of the vehicle.

FIGS. 3A-3B illustrate example configurations of vehicles and frame structures. Other configurations are also possible, however. Moreover, the frame structures and the body structures shown in FIGS. 3A-3B are intended more as schematic representations of these components, and these components may include other structures that are omitted from FIGS. 3A-3B for clarity. Additional structural connections and integrations may be made between the body structures and the frame structures than are explicitly represented in FIGS. 3A-3B. For example, components a door mechanism that open and close the doors of the body structures may be joined to both the doors and to the frame structures.

Figure 4:
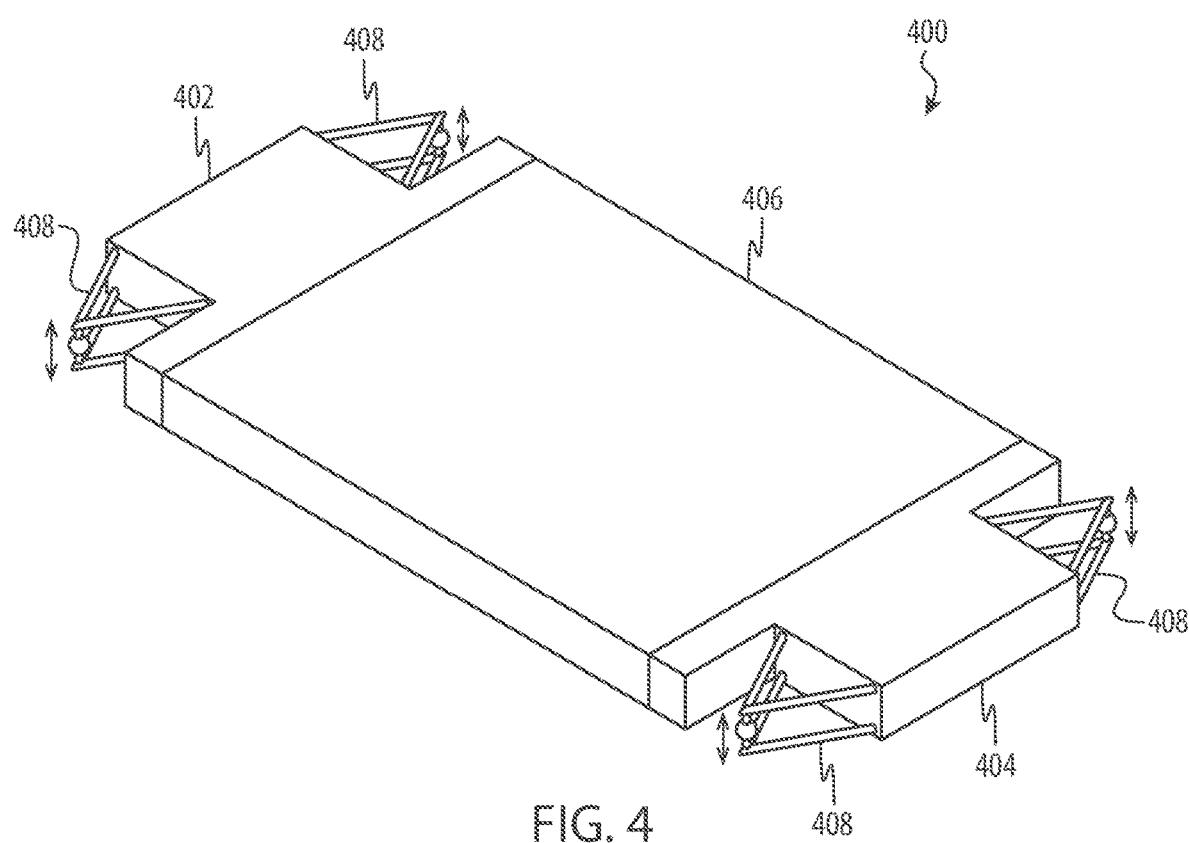
FIG. 4 depicts an example frame structure with independent suspension systems.

As noted above, vehicles as described herein may include suspension systems that provide comfort and safety to occupants of the vehicle. FIG. 4 shows an example frame structure 400 that includes four independent suspensions systems 408 to which wheels may be coupled. The suspensions systems 408 are illustrated as double-wishbone suspension systems, though other types of suspension systems may be used instead of or in addition to the double-wishbone suspensions. In some cases, as described herein, each of the suspension systems 408 may be independently adjustable to allow accommodate for variations in the weight and distribution of the load of the vehicle and its passengers, and to adjust the ride height (and optionally pitch and roll) of the vehicle. For example, the preload of each suspension system may be adjustable to accommodate for changes in the suspension loading due to the addition of passengers or freight. The preload adjustment may be used to change the ride characteristics of the suspension, the ride height of the vehicle, or the like. Further, these adjustments may be made in real-time to provide a dynamic, adaptable suspension system.

Each suspension system 408 include or be associated with one or more sensors that detect properties of a vehicle and/or the suspension systems 408 of the vehicle. For example, position sensors at or near each wheel may determine a height of the vehicle at that particular corner of the vehicle. By including individual position sensors for each wheel, the vehicle may be able to determine its overall ride height, as well as to detect deviations in pitch or roll of the vehicle (e.g., due to non-uniform weight distribution of a payload). As another example, load sensors may determine a load (e.g., weight) supported by each wheel. In some cases, each suspension system 408 includes or is associated with both a position sensor and a load sensor.

In some cases, a load sensor may be used to calculate a ride height or position of a suspension system. For example, a load sensor may determine a load applied to a suspension system (due to the vehicle's weight), and a spring rate associated with that suspension system may be used to calculate the expected deflection of the suspension system based on the detected load. Similarly, the spring rate and a detected ride height (or other suspension position) may be used to calculate an estimated load applied to a suspension system. Information from the position and/or load sensor(s) may be used as input to a control scheme that controls various aspects of the suspension systems 408. For example, a control scheme may use information from position sensors as feedback to a control system that adjusts and/or controls the ride height of the vehicle (e.g., by changing suspension preload, as described herein). Further, because each wheel may be associated with its own position and/or load sensor, the control system may be able to control and adjust the suspension of each wheel individually.

The sensors associated with each wheel may facilitate closed-loop servo control over the independent suspension systems. For example, each wheel may be associated with a position sensor that reports the actual ride height of the vehicle (or information from which the ride height can be determined). The vehicle may then issue a command to change the ride height at a particular wheel (or all wheels). This may cause the suspension preload to be adjusted until the target ride height is achieved. Example preload adjustment systems are described herein.

FIG. 4 illustrates a frame structure 400 that includes wheel modules 402, 404 and a base module 406 (which may be embodiments of the wheel modules 306, 308 and the base module 310, FIG. 3A). In particular, each wheel module 402, 404 may include two suspension systems 408, one for each of two opposite wheels. Where a two-module frame structure is used, such as in FIG. 3B, the suspension systems 408 may be coupled to the wheel modules in the same or similar manner.

Figure 5A:
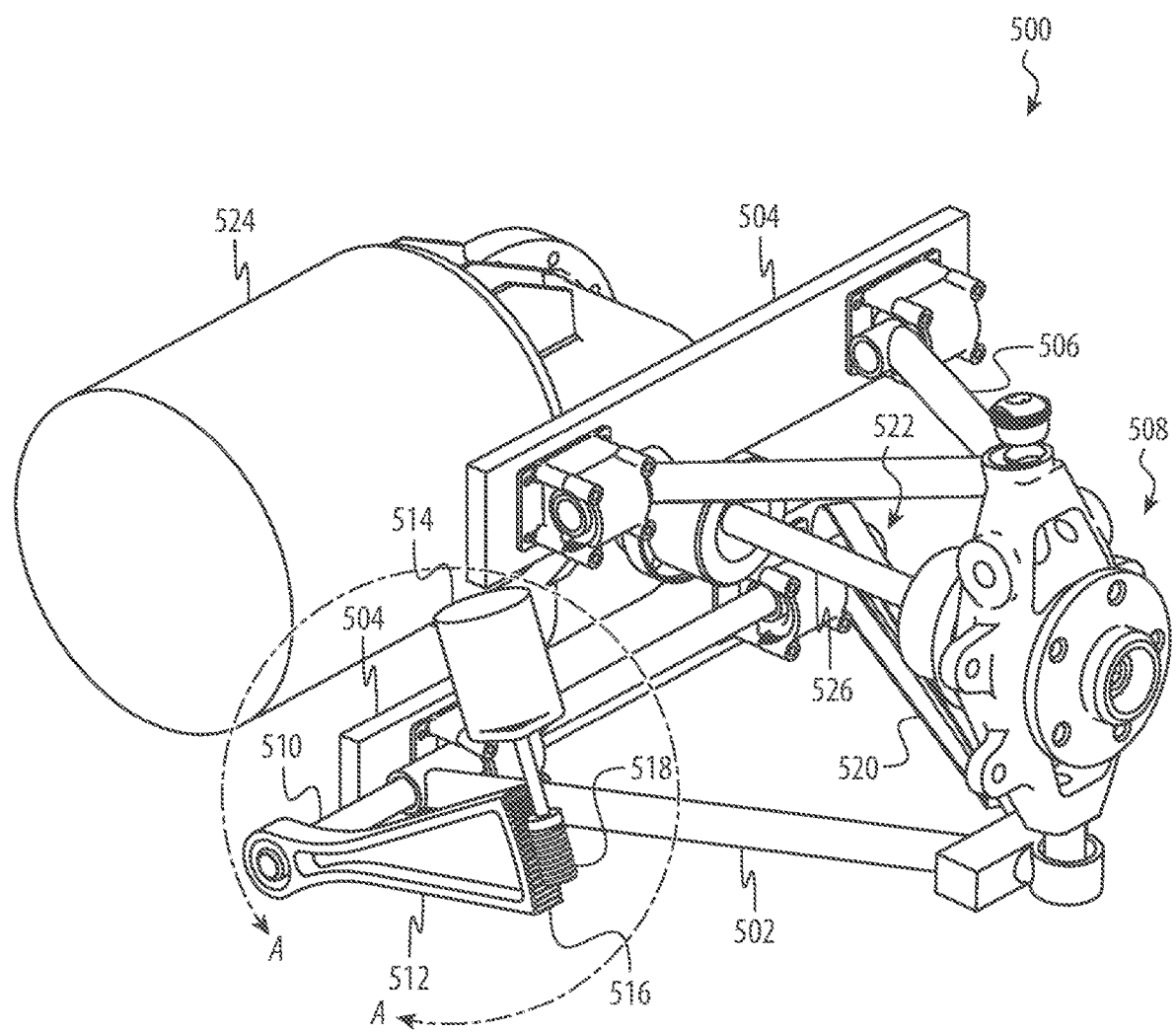
FIG. 5A depicts an example suspension system.

FIG. 5A shows a perspective view of a portion of a vehicle having an example suspension system 500. The suspension system 500 is shown as a double-wishbone style suspension, though other types of suspension systems may be used instead.

The suspension system 500 includes a lower suspension arm 502 (e.g., a lower A-arm) that is pivotally coupled to a frame structure 504 at a first or proximate end of the lower suspension arm 502. The suspension system 500 may also include an upper suspension arm 506 (e.g., an upper A-arm) that is pivotally coupled to the frame structure 504 at a first or proximate end of the upper suspension arm 506. The frame structure 504 may be part of a wheel module or other component of a frame structure of a vehicle, as described herein.

The upper and lower suspension arms 506, 502 may be coupled to a wheel mount 508 at a respective second or distal end of the upper and lower suspension arms 506, 502. The wheel mount 508 may be configured to mount a wheel assembly (omitted from this figure) which may include a wheel, a hub, one or more wheel bearings, and brake components (among other possible components). The wheel assembly may be coupled to the wheel mount 508, which is configured to provide suspension compliance during operation of the vehicle. In particular, the wheel assembly may be coupled to the upper and lower suspension arms 506, 502 via the wheel mount 508, which may movably support the wheel relative to the frame structure 504 of the vehicle.

The wheel assembly (and thus the wheel itself) may be driven by a motor 524 through a drive shaft 526. As shown in FIG. 5A, the motor 524 may be attached to or otherwise coupled to the frame structure 504. The driveshaft 526 may be coupled to the motor 524 and to a component of the wheel assembly (e.g., the hub) to drive the wheel assembly. Another drive shaft may extend from the opposite side of the motor to drive another wheel of the vehicle.

The suspension system 500 may also include a torsion bar 510 coupled to the lower suspension arm 502. The torsion bar 510 may be coupled to the lower suspension arm 502 via a splined connection proximate an end 522 of a member 520 of the lower suspension arm 502. The splined connection may prevent or inhibit relative motion of an end of the torsion bar 510 with respect to the lower suspension arm 502. (Other types of connections between the torsion bar 510 and the lower suspension arm 502 may also be used.) The torsion bar 510, through the splined connection to the lower suspension arm 502, may provide a spring force (e.g., spring torque) to the lower suspension arm 502, and by extension, to the wheel coupled to the wheel mount 508. In some cases, the torsion bar 510 provides the sole spring force to the suspension system 500. In other cases, the suspension system 500 includes one or more separate spring components instead of or in addition to the torsion bar 510. The one or more separate springs may include one or more additional torsion bars, coil springs, air springs, elastomer springs, or the like. Multiple springs may be used to produce a desired spring rate for the suspension system, such as a nonlinear or progressive spring rate.

An end of the torsion bar 510 that is opposite the splined connection to the lower suspension arm 502 may be coupled to a preload arm 512. The preload arm 512 may be configured to constrain the end of the torsion bar 510 and provide the resistance against rotating (relative to the end of the torsion bar 510 that is anchored to the lower suspension arm 502) that results in a spring force or torque being applied to the lower suspension arm 502. As shown in FIG. 5A, the preload arm 512 is coupled to a worm gear 518 that restricts or controls the rotational motion of the preload arm 512 and, thus, restricts or controls to rotational motion of the respective end of the torsion bar 510.

As shown in FIG. 5A, a preload adjustment motor 514 may be coupled to the preload arm 512 via a worm gear 518 (or other similar coupling) to adjust an amount of preload on the torsion bar. For example, the preload arm 512 may include a set of gear teeth 516, and a worm gear 518 (which may be driven by the preload adjustment motor 514) may be engaged with the gear teeth 516 of the preload arm 512. In this example, the gear teeth 516 are arranged along an arc having a center that is aligned with the center or axis of the torsion bar 510. Rotating the worm gear 518 may rotate the preload arm 512, thereby changing an amount of preload applied to the torsion bar 510 (e.g., by torqueing or twisting the torsion bar 510). Because the torsion bar 510 is coupled to the lower suspension arm 502, the preload applied to the torsion bar 510 may result in a change in the overall spring preload of the suspension system. In some cases, vehicles used in a transportation system as described herein may be designed to accommodate loads that may vary by about 500 kg or more. As such, the preload may be variable by a similar amount to accommodate for this possible range of loads. In other systems, the range of preload adjustability may correspond to the range of expected load variability of the vehicle.

The preload adjustment motor 514 may be any suitable type of motor, including an electric motor, hydraulic motor, pneumatic motor, or the like. Further, while the preload adjustment mechanism is described as including a worm gear, the motor 514 may be coupled to the preload arm 512 using other types of gears, such as spur gears, helical gears, bevel gears, or the like, or even via linkages, arms, or cams. As noted above, the preload adjustment motor 514 may be used in a closed-loop control scheme to control suspension parameters. Moreover, the preload adjustment motor 514 itself may use a closed-loop control scheme to ensure that its target preload position is achieved.

In some cases, other mechanisms may be used to adjust the torque applied to the torsion bar 510. For example, a nut of a lead screw or ball screw may be coupled to the preload arm 512, and a motor may rotate the shaft of the lead screw or ball screw to move the preload arm 512 and change the amount of torque applied to the torsion bar 510. FIG. 5D illustrates an example lead or ball screw mechanism for adjusting a preload arm. In another embodiment, a hydraulic, electric, or pneumatic piston is coupled to the preload arm 512 and pushes or pulls the preload arm 512 to change the amount of torque applied to the torsion bar 510. Further, while FIG. 5A shows a suspension system in which each individual suspension system has independently adjustable preload, in some cases multiple preload arms 512 may be operated on concert. For example, a single motor may operate two preload arms of two suspension systems that are coupled via a structural link or some other structural coupling. This may result in a vehicle in which each pair of wheels share the same preload setting and/or may have respective preloads that are adjusted in tandem.

Regardless of the particular mechanism used, the preload adjustment mechanism may be configured to be non-backdrivable. Thus, once a target torque (which produces a target suspension preload) is applied to the torsion bar 510 via the preload arm 512, the preload adjustment motor 514 may be deactivated so that it is not actively producing torque. This may help increase the efficiency of the suspension system, as the preload adjustment motor 514 need not produce torque constantly in order to maintain the preload at a desired value. In some cases, mechanical locks or brakes are provided in order to help maintain the target preload and prevent the preload arm 512 from backdriving the preload adjustment motor 514. In some cases, the gear ratio or gear teeth interface between the gear teeth 516 and the worm gear 518 are high enough to prevent or reduce movement of the preload arm 512 due to normal movement of the wheel assembly or suspension system.

Figure 5B:
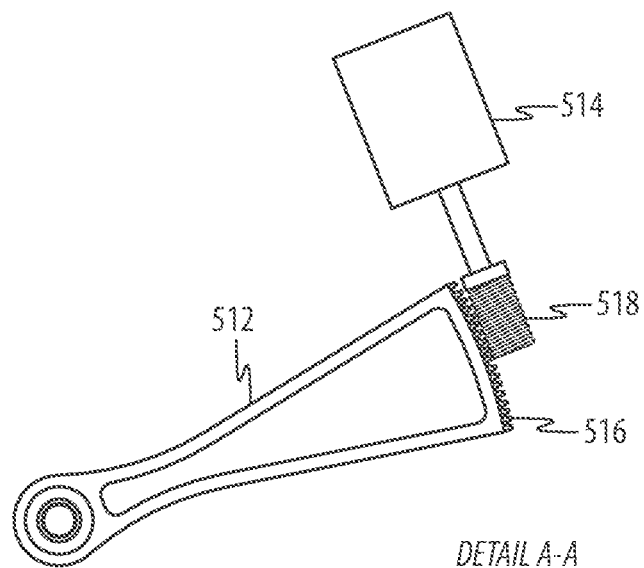
FIGS. 5B-5C depict detail views of the suspension system of FIG. 5A.
Figure 5C:
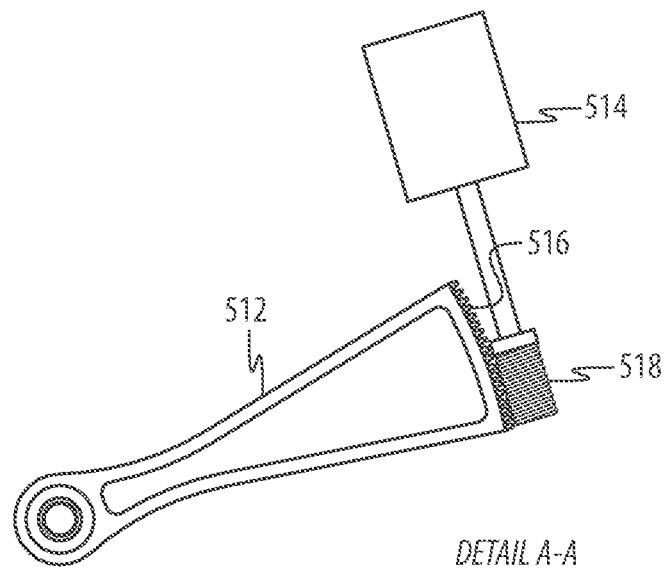
Figure 5D:
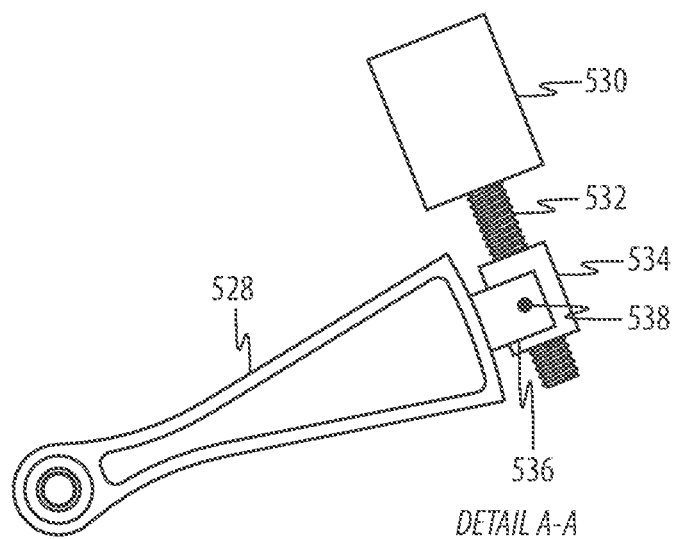
FIG. 5D depicts a detail view of another example suspension system.

FIGS. 5B and 5C show a detail view of the suspension system 500 corresponding to area A-A in FIG. 5A. FIG. 5B shows the suspension system 500 with the preload adjusted to a minimum value (e.g., applying the minimum amount of torque to the torsion bar 510, FIG. 5A). FIG. 5C shows the suspension system 500 when the preload arm 512 is imparting the maximum preload to the torsion bar 510 (FIG. 5A). As shown in FIG. 5C, the preload adjustment motor 514 has rotated the worm gear 518 to advance the preload arm 512, thereby apply an increased torque to the torsion bar 510. While maximum and minimum preload positions are shown, the preload may be adjusted to any point at or between the maximum and minimum preload positions.

FIG. 5D shows another example mechanism for adjusting suspension preload by rotating a preload arm. For example, FIG. 5D illustrates a preload arm 528 (which may be similar to the preload arm 512, and may be incorporated with a suspension system such as the suspension system 500). The preload arm 528 may include a nut mount 536, which may be a distinct component that is attached to the preload arm 528, or an integral part of the preload arm 528 (e.g., the preload arm 528 and the nut mount 536 may be a monolithic component such as a single cast, forged, or machined component). The nut mount 536 may be a clevis or any other suitable structure for pivotally or flexibly coupling a nut to the preload arm 512.

A nut 534 may be attached to the nut mount 536, and a screw 523 may be engaged with the nut 534 and rotatable by a preload adjustment motor 530. The nut 536 may be pivotally coupled to the nut mount 536 (e.g., via a pivot pin 538 or other suitable pivoting or flexible mechanism) so that the nut 534 can rotate or pivot to maintain coaxial alignment with the screw 532 when the screw 532 is rotated. The preload adjustment motor 530 may be similar to or an embodiment of the preload adjustment motor 514.

When the screw 532 is rotated by the preload adjustment motor 530, it may push or pull on the nut 534, thereby rotating the preload arm 528 and, by extension, decreasing or increasing the suspension preload. The screw 532 and nut 534 may be a lead screw or a ball screw system. In either case, the screw 532 and the nut 534 may be configured to be non-backdrivable, such that the preload arm 528 remains in a stable position even when the preload motor 530 is not active. For example, the threads of the screw 532 may have a pitch that is configured to prevent backdriving, at least at the operating conditions of the suspension system.

Adjustment of the preload may be used to change one or more suspension characteristics of the vehicle. For example, as described in greater detail herein, the preload may be adjusted by the preload adjustment motor 514 to adjust a ride height or adjust a pitch or roll angle of the vehicle, maintain a ride height of the vehicle despite changes in the loading of the vehicle, lower the vehicle against hard-stops for loading and/or calibration, or the like. Examples of these use cases are described herein with respect to FIGS. 6A-8.

Figure 6A:
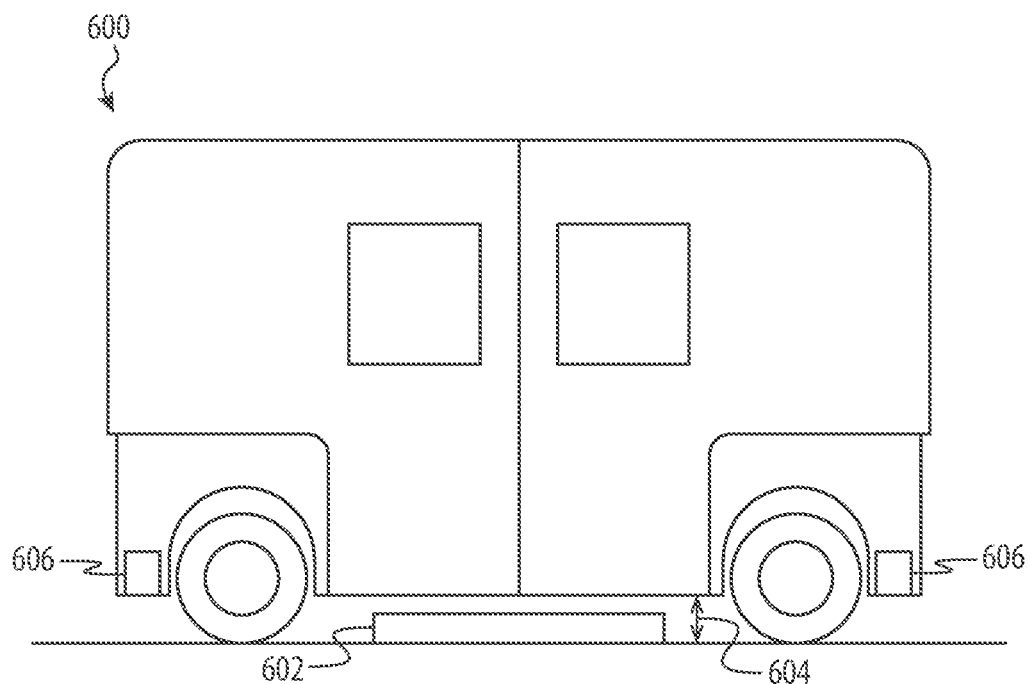
FIGS. 6A-6B depict a vehicle at a first ride height and a second ride height, respectively.
Figure 6B:
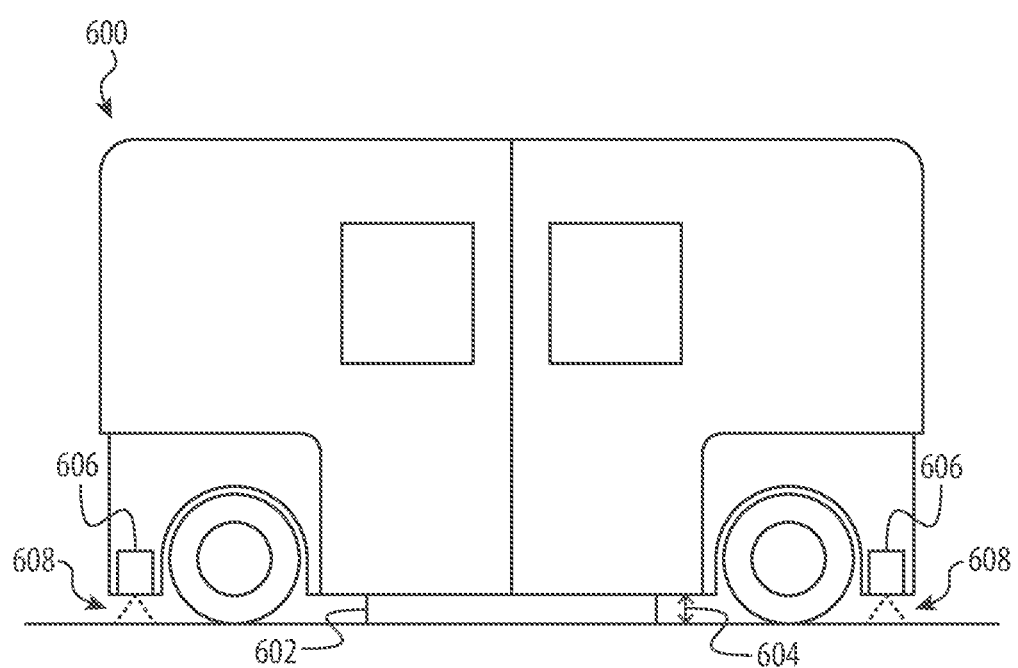

FIGS. 6A-6B illustrate an example vehicle 600 that may be equipped with adjustable independent suspension as described above, with the suspension in two different states. The vehicle 600 may include four wheels, with each wheel movably supported by a suspension system in accordance with FIG. 5A.

FIG. 6A illustrates the vehicle 600 in a first state where the suspension is preloaded so that the vehicle 600 has a first ride height, as indicated by arrow 604. FIG. 6A may illustrate a normal driving ride height. This ride height may allow sufficient suspension travel to provide a comfortable and safe ride and also allow sufficient clearance below the vehicle so that bumps, debris, or other objects on the road do not interfere with or contact the underside of the vehicle.

In some cases, it may be desirable to lower the vehicle 600 onto a hard-stop 602 so that the vehicle 600 is no longer supported by the suspension. The hard-stop, in conjunction with the active height-adjustable suspension described above, may be used, for example, when the vehicle 600 arrives at a passenger or freight loading zone and it is desirable to prevent the vehicle 600 from bouncing or rocking as passengers enter or exit the vehicle or freight is loaded into or unloaded from the vehicle 600. This may also be used in order to position the vehicle 600 in a fixed and known position relative to other surfaces. For example, the vehicle 600 may include sensors (e.g., sensors 606) that need to be calibrated by positioning the vehicle 600 (and consequently the sensors 606) a known distance relative to another surface. By lowering the vehicle 600 onto a hard-stop, the sensors on vehicle 600 may be positioned at a known position and/or distance from other objects or surfaces, thereby facilitating calibration of the sensors. As yet another example, the vehicle 600 may lower itself onto the hard stop 602 for maintenance, cleaning, repair, or the like.

FIG. 6B shows the vehicle 600 lowered onto a hard stop 602. In this condition, the ride height of the vehicle, indicated by arrow 610, may be lower than the ride height 604 shown in FIG. 6A. The hard stop may be a support, jack, stand, prop, block, or any other suitable structure that can support the vehicle and that the vehicle can be driven over so that the vehicle is positioned over the hard stop 602. The hard stop 602 may be integrated into a station or loading zone of the vehicle system. The hard stop 602 may also be a movable component that may be placed under the vehicle, when needed. In some cases, the hard stop 602 (or portions of the hard stop 602) are integrated with the vehicle.

The lowering of the vehicle 600 onto the hard stop 602 may be accomplished by reducing the preload on the suspension of each of the wheels of the vehicle 600 until the vehicle is resting on the hard stop 602. The vehicle 600 may determine that it is resting on the hard stop 602 in any suitable way, such as using load sensors of the suspension systems, contact sensors, distance sensors, or the like. For example, the vehicle 600 may reduce the preload on the suspension systems until it is determined that the vehicle 600 has stopped traveling downward. In another example, the vehicle 600 may reduce the preload on the suspension systems until it is determined that the vehicle has contacted a hard stop 602.

Once the vehicle 600 is determined to be resting on the hard stop 602, one or more other processes may occur. For example, where the vehicle is on the hard stop 602 to allow passengers or freight to enter or exit the vehicle 600, the vehicle doors may be opened. Once the passenger or freight loading or unloading has completed (which may be indicated by a passenger or attendant), the doors may be closed and the vehicle 600 may lift itself off of the hard stop 602 (e.g., by increasing the preload on the suspension systems) and drive away from the hard stop 602. As another example, if the vehicle 600 is on the hard stop 602 to facilitate sensor calibration, once the vehicle 600 is determined to be on the hard stop 602, the sensors 606 (or any other sensor) may perform a calibration routine (indicated by sensor activity 608). Once the calibration is finished, the vehicle 600 may increase its suspension preload to lift itself off of the hard stop 602 so it can drive away.

Figure 7A:
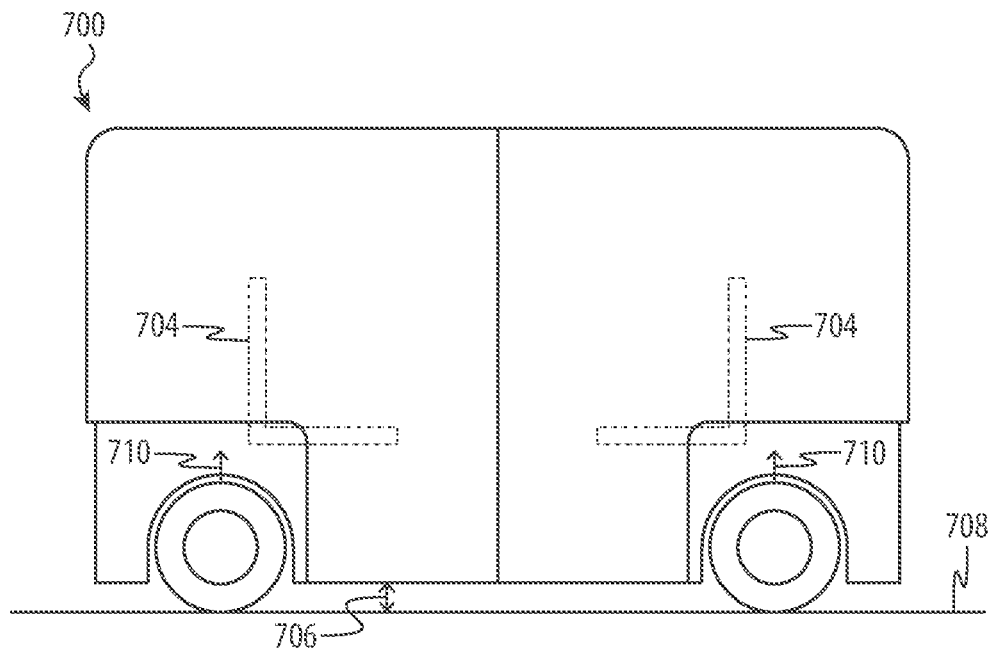
FIGS. 7A-7B depict a vehicle with a first suspension preload and a second suspension preload, respectively.
Figure 7B:
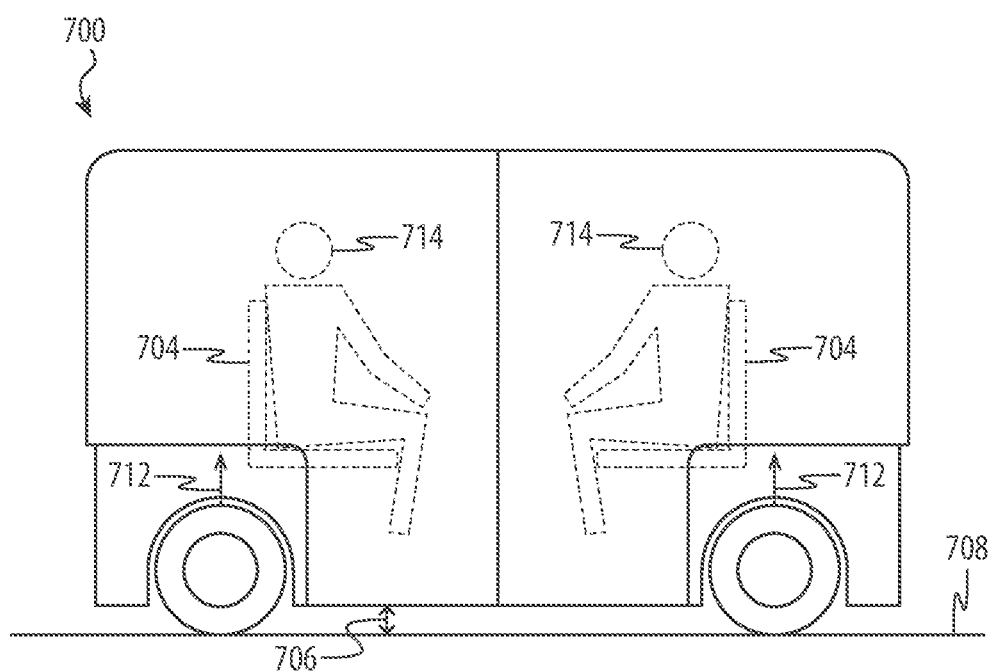

FIGS. 7A-7B illustrate an example vehicle 700 that may be equipped with adjustable independent suspension as described above, with the suspension in two different states. The vehicle 700 may include four wheels, with each wheel movably supported by a suspension system in accordance with FIG. 5A.

FIG. 7A illustrates the vehicle 700 in a first state where the vehicle is empty and the suspension is preloaded so that the vehicle 700 has a first ride height, as indicated by arrow 706. The first ride height may be produced by applying a first preload to the suspension systems, resulting in a first suspension force 710 on the body (and/or frame) of the vehicle 700. This force 710 may be substantially equal to the empty or unloaded weight of the vehicle 700 as shown in FIG. 7A.

In some cases it may be advantageous to maintain the ride height of the vehicle 700 despite changing loads of the vehicle. For example, it may be advantageous to increase the suspension preload while passengers are entering the vehicle 700 (and/or after they have entered the vehicle 700). This may help maintain the vehicle height at a target height for driving and transport despite the change in payload weight, and may provide for a safer and more comfortable loading and unloading experience. For example, FIG. 7B shows the vehicle 700 with passengers 714 sitting on internal seats 704. Due to the increased load from the passengers 714, the suspension preload of one or more of the suspension systems may be increased to produce a second suspension force 712 (which is greater than the suspension force 710, FIG. 7A). By increasing the suspension preload in response to the additional passenger weight, the ride height 706 of the vehicle 700 may be maintained despite the additional weight, as illustrated by the vehicle 700 having the same ride height in FIGS. 7A and 7B.

In some cases, the suspension systems may be controlled sufficiently rapidly that the vehicle 700 does not droop or bounce when a person enters or freight is loaded into the vehicle. For example, the vehicle 700 may detect the additional weight and immediately thereafter (e.g., within about 1 second, within about 0.5 seconds, within about 0.1 seconds) adjust the suspension preload to overcome the additional weight and maintain the height of the vehicle 700. The same control scheme may prevent the vehicle 700 from rising or bouncing when a person exits the vehicle or when freight is unloaded from the vehicle. In this manner, the suspension system may essentially simulate the vehicle being on a hard stop during loading and unloading. Once the vehicle has been loaded or unloaded, the suspension system may change to a different mode or state in which the preload is not dynamically adjusted to maintain a constant ride height.

Further, the suspension system may be used to position the vehicle so that its floor is level with a loading platform or station, and the dynamic adjustment of the suspension (e.g., the preload) may be used to maintain the vehicle at that position during loading and unloading. This may be advantageous because it can prevent the formation of lips, steps, or other misalignments between a loading platform and the floor of the vehicle, which may be tripping or catching hazards. Of course, because the suspension system of each wheel may be controlled independently, the suspension preloads of wheels may differ from one another in order to maintain the vehicle in a level attitude (e.g., horizontal).

Figure 8:
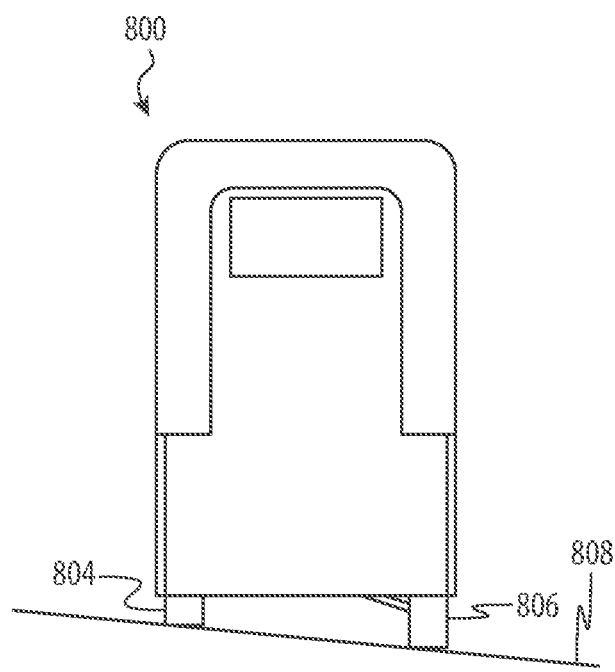
FIG. 8 depicts an example vehicle on a slanted road surface.
Figure 9:
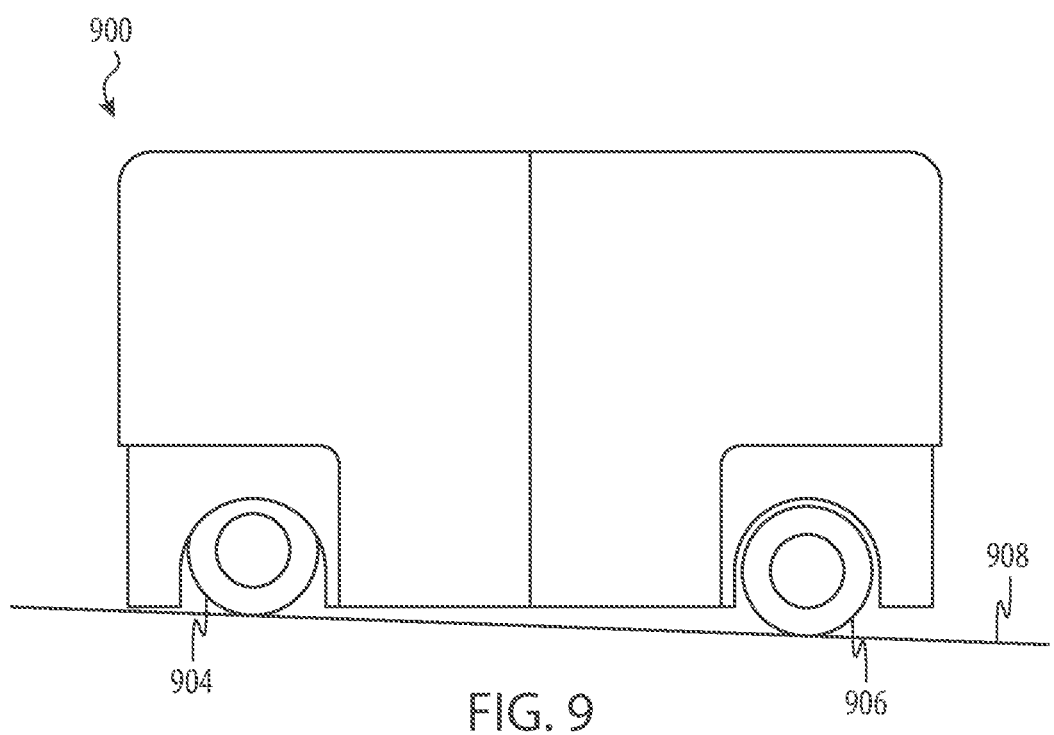
FIG. 9 depicts an example vehicle on another slanted road surface.

The independently adjustable suspension may also be used to help maintain a vehicle body at a desired attitude (e.g., substantially horizontal) despite angled or slanted road surfaces (or based on non-uniformly aligned loads). FIGS. 8 and 9 illustrate two example scenarios in which the suspension of a vehicle accommodates for non-horizontal road surfaces.

FIG. 8 depicts an end view of a vehicle 800 driving along an angled road surface 808. In order to maintain the vehicle 800 in a substantially level or horizontal state, the vehicle 800 may increase the suspension preload on the wheel 806 relative to the wheel 804 so that the height of the vehicle over the wheel 806 is higher than the height of the vehicle 800 over the wheel 804. As shown in FIG. 8, the road surface 808 is slanted along a direction that is perpendicular to the direction of travel (e.g., the vehicle 800 is driving along a crowned road surface).

The suspension preload may be changed by changing the torque applied to a torsion bar of a suspension system, as described above with respect to FIG. 5A. Further, it will be understood that the wheels that are occluded by the wheels 804, 806 will be controlled in a manner similar to the wheels 804, 806 to produce the resulting vehicle attitude.

The vehicle 800 may initiate the suspension adjustment in response to detecting a roll motion of the vehicle 800. For example, sensors in the vehicle (e.g., accelerometers, gyroscopes) may detect a roll motion of the vehicle, which may indicate that the vehicle 800 is on a slanted or crowned road surface. In response to detecting the roll motion, the vehicle 800 may increase the preload on the suspension associated with the wheel 806 (as well as the other wheel of the vehicle that is occluded by the wheel 806 in FIG. 8), thereby compensating for the roll motion and returning the vehicle to a level position. The vehicle 800 may also increase the preload on some of the wheels during a turn event. For example, when the vehicle 800 detects that it is turning (e.g., via sensors or due to a control signal indicating that the vehicle is commanded to turn), it may stiffen the preload on the wheels on the outside of the turn and optionally reduce (or maintain) the preload on the wheels on the inside of the turn. This may help maintain the vehicle in a level orientation during turning and may also help mitigate rollover risk.

FIG. 9 depicts an end view of a vehicle 900 driving along an angled road surface 908. In order to maintain the vehicle 900 in a substantially level or horizontal state, the vehicle 900 may increase the suspension preload on the wheel 906 relative to the wheel 904 so that the height of the vehicle over the wheel 906 is higher than the height of the vehicle 900 over the wheel 904. As shown in FIG. 9, the road surface 908 is slanted along a direction that is parallel to the direction of travel (e.g., the vehicle 900 is driving up or down a hill).

The suspension preload may be changed by changing the torque applied to a torsion bar of a suspension system, as described above with respect to FIG. 5A. Further, it will be understood that the wheels that are occluded by the wheels 904, 906 will be controlled in a manner similar to the wheels 904, 906 to produce the resulting vehicle attitude.

The vehicle 900 may initiate the suspension adjustment in response to detecting a pitch motion of the vehicle 900. For example, sensors in the vehicle (e.g., accelerometers, gyroscopes) may detect a pitch motion of the vehicle, which may indicate that the vehicle 900 is on an inclined road surface (e.g., a hill). In response to detecting the pitch motion, the vehicle 900 may increase the preload on the suspension associated with the wheel 906 (as well as the other wheel of the vehicle that is occluded by the wheel 906 in FIG. 9), thereby compensating for the pitch motion and returning the vehicle to a level position.

In the scenarios depicted in FIGS. 8 and 9, the vehicles are maintained in a substantially level or horizontal attitude even as the vehicles are travelling along roads that are not level or horizontal. This may improve the safety and comfort of vehicle passengers, as the vehicle may be prevented from pitching and/or rolling during travel. Moreover, this process may also help prevent rollover accidents by reducing or eliminating the roll of the vehicle.

The vehicles 800, 900 may also dynamically adjust their suspension in real-time to maintain a level attitude (or another attitude that is different from the angle of the road surface). Thus, the vehicle may adjust its suspension as shown in FIG. 8 when travelling along a crowned road surface, and then readjust its suspension as shown in FIG. 9 when travelling up or down a hill. Of course, while FIGS. 8 and 9 illustrate several example road surfaces and vehicle attitudes, these are merely examples of several simple scenarios. Due to the dynamic and adaptable nature of the vehicles' suspension systems, other target attitudes and combinations of suspension settings may also be used. For example, if a vehicle is travelling down a hill with a crowned road surface, each wheel's suspension may have a different preload to help maintain or approach a level attitude.

In other cases, it may be advantageous to adjust the suspension so that the vehicle is not level. For example, if the vehicle is experiencing wind loading (e.g., a cross-wind), the vehicle may be tilted into the wind to counteract the wind load and prevent or mitigate rolling, tipping, or pitching due to the wind. Instead of or in addition to tilting the vehicle, the vehicle may simply lower itself (and optionally reduce its speed) to lower the center of gravity of the vehicle and help prevent or mitigate the effects of the wind.

Other suspension manipulations are also facilitated by the independently adjustable suspension described herein. In some cases, suspension parameters (e.g., preload, spring rate, damping characteristics, travel) may be optimized for the particular type of payload being carried. For example, vehicles for use in an autonomous transportation system may be used to transport both people and freight. When the vehicles are carrying people, the suspension system may be adjusted to provide a comfortable ride, which may include longer suspension travel and a softer-feeling suspension response. When the vehicles are carrying freight, on the other hand, personal comfort may not be as important. Accordingly, the suspension may be adjusted to have a stiffer feel with less travel. Where the vehicles are carrying freight, the suspension response may be optimized for other results, such as fuel efficiency, reduction in wear (e.g., to the tires or suspension components), or the like.

As noted above, the suspension systems described herein may use closed-loop control to control aspects and parameters of the suspension systems and the vehicle more generally. As one example control scheme, each wheel may be associated with a position sensor that may directly measure or be used to determine ride height, or other parameters of the vehicle or suspension system. The vehicle may use these position sensors as feedback in a closed-loop control scheme for each wheel, where each individual preload adjustment motor is controlled based at least in part on the position feedback for that particular wheel. For example, a vehicle controller may establish a target ride height, and each suspension system may independently adjust its preload so that it's corresponding position sensor reports that the target ride height is reached. In some cases the vehicle controller may command each wheel to have a different ride height, in which case the suspension systems may each have a different target and may be adjusted independently of one another so that they each achieve their target ride height (or other suspension parameter, such as damping rate, spring rate, or the like).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A vehicle configured to autonomously travel between passenger loading stations in a transportation system, the vehicle comprising:
   a frame structure;
   a set of wheels;
   an adjustable suspension system supporting the set of wheels relative to the frame structure and configured to adjust a height of the frame structure relative to a road surface; and
   a control system operably coupled to the adjustable suspension system and configured to:
      cause the vehicle to travel to a passenger loading zone at a passenger loading station;

at the passenger loading zone, adjust the height of the frame structure to a first height relative to the road surface to position a floor of the vehicle substantially level with a loading platform at the passenger loading zone; and prior to departing the passenger loading zone, adjust the height of the frame structure to a second height relative to the road surface, the second height different from the first height, to facilitate travel to a next destination.

2. The vehicle of claim 1, wherein adjusting the height of the frame structure to the first height to position the floor of the vehicle substantially level with the loading platform at the passenger loading zone comprises lowering the vehicle.

3. The vehicle of claim 1, wherein adjusting the height of the frame structure to the first height to position the floor of the vehicle substantially level with the loading platform at the passenger loading zone comprises lowering the frame structure onto a rigid support structure below the vehicle.

4. The vehicle of claim 3, wherein adjusting the height of the frame structure to the second height comprises raising the frame structure off of the rigid support structure.

5. The vehicle of claim 1, wherein adjusting the height of the frame structure to the second height comprises raising the frame structure from the first height to the second height.

6. The vehicle of claim 1, further comprising a sensor configured to detect the height of the frame structure relative to the road surface.

7. The vehicle of claim 1, wherein:
the vehicle further comprises a door; and
the control system is configured to cause the door to open in response to a determination that the floor of the vehicle is substantially level with the loading platform.

8. A vehicle configured to autonomously travel between passenger loading stations in a transportation system, the vehicle comprising:
a frame structure;
a set of wheels;
an adjustable suspension system supporting the set of wheels relative to the frame structure and configured to adjust a height of the frame structure relative to a road surface; and
a control system operably coupled to the adjustable suspension system and configured to:
operate the adjustable suspension system in a first mode during transit to a passenger loading station, wherein in the first mode the frame structure is suspended, relative to the road surface, by the adjustable suspension system; and
operate the adjustable suspension system in a second mode upon arrival at a passenger loading zone, wherein in the second mode the frame structure is lowered onto a rigid support structure at the passenger loading zone.

9. The vehicle of claim 8, wherein operating the adjustable suspension system in the second mode further includes, prior to departing the passenger loading zone, raising the frame structure off of the rigid support structure.

10. The vehicle of claim 8, wherein the vehicle further comprises a sensor system configured to:
detect the height of the frame structure relative to the road surface; and
determine when the frame structure is supported by the rigid support structure.

11. The vehicle of claim 8, wherein, when the frame structure is lowered onto the rigid support structure, a floor of the vehicle is substantially level with a loading platform at the passenger loading zone.

12. The vehicle of claim 8, wherein lowering the frame structure onto the rigid support structure comprises reducing a spring preload of the adjustable suspension system.

13. The vehicle of claim 8, wherein:
the vehicle further comprises a door; and
the control system is configured to cause the door to open in response to a determination that the frame structure is resting on the rigid support structure.

14. The vehicle of claim 13, wherein the control system is further configured to, in response to receiving an indication that a loading operation has completed:
cause the door to close; and
after the door is closed:
raise the frame structure off of the rigid support structure; and
cause the vehicle to depart the passenger loading zone.

15. A method for operating a vehicle comprising:
the vehicle comprising a frame structure and an adjustable suspension system:
adjusting, with the adjustable suspension system of the vehicle, a height of the frame structure relative to a road surface to position a floor of the vehicle substantially level with a loading platform at a passenger loading zone; and
prior to departing the passenger loading zone, changing, with the adjustable suspension system, the height of the frame structure relative to the road surface to facilitate travel to a next destination.

16. The method of claim 15, wherein changing the height of the frame structure with respect to the road surface comprises raising the vehicle.

17. The method of claim 16, wherein adjusting the height of the frame structure relative to the road surface to position the floor of the vehicle substantially level with the loading platform comprises lowering a frame of the vehicle onto a rigid support structure.

18. The method of claim 17, wherein changing the height of the frame structure relative to the road surface to facilitate travel to the next destination comprises raising the frame of the vehicle off of the rigid support structure.

19. The method of claim 15, wherein:
the vehicle further comprises a door; and
the method further comprises opening the door in response to a determination that the floor of the vehicle is substantially level with the loading platform.

20. The method of claim 19, further comprising closing the door in response to response to receiving an indication that a loading operation has completed.

* * * * *